United States Patent
Nishimaki et al.

(10) Patent No.: US 6,810,433 B1
(45) Date of Patent: Oct. 26, 2004

(54) PERIPHERAL DEVICE FOR PROGRAMMABLE CONTROLLER

(75) Inventors: Tsuyoshi Nishimaki, Tokyo (JP); Makoto Nonomura, Nagoya (JP); Tomoyuki Suga, Nagoya (JP); Kenji Hirota, Nagoya (JP); Yoshiaki Gotou, Nagoya (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 751 days.

(21) Appl. No.: 09/643,954

(22) Filed: Aug. 23, 2000

Related U.S. Application Data

(63) Continuation of application No. PCT/JP99/00270, filed on Jan. 25, 1999.

(51) Int. Cl.[7] .......................... G06F 9/34; G06F 9/00; G06F 9/44; G06F 12/00; G06F 12/10

(52) U.S. Cl. .................. 710/5; 710/8; 710/9; 710/104; 718/100; 718/101; 711/202; 712/32; 712/208; 712/210; 712/220; 712/245; 700/11; 700/13; 700/19; 700/24; 700/90

(58) Field of Search ............................. 710/1, 2, 5, 8, 710/9, 10, 104, 305; 711/202; 700/1, 11, 13, 18, 19, 23, 24, 89, 90; 712/1, 2, 7, 10, 16, 24, 32, 37, 42, 208, 210, 220, 245, 300; 718/100, 101; 719/327

(56) References Cited

U.S. PATENT DOCUMENTS

| | | | | |
|---|---|---|---|---|
| 4,227,247 A | * | 10/1980 | Kintner | 700/18 |
| 4,365,312 A | * | 12/1982 | Nakano et al. | 700/23 |
| 4,443,865 A | * | 4/1984 | Schultz et al. | 712/242 |
| 5,038,317 A | * | 8/1991 | Callan et al. | 710/301 |
| 5,243,511 A | * | 9/1993 | Zifferer et al. | 700/18 |
| 5,295,059 A | * | 3/1994 | Brooks et al. | 700/18 |
| 5,610,809 A | * | 3/1997 | Morita | 700/23 |
| 6,334,075 B1 | * | 12/2001 | Mase et al. | 700/9 |

FOREIGN PATENT DOCUMENTS

| | | |
|---|---|---|
| DE | 32 42 631 | 5/1983 |
| JP | 63-175930 | 7/1988 |
| JP | 5-2410 | 1/1993 |
| JP | 9-204204 | 8/1997 |
| JP | 10-340108 | 12/1998 |
| KR | 1998-024029 | 7/1998 |
| KR | 1998-073799 | 11/1998 |

* cited by examiner

*Primary Examiner*—Jeffrey Gaffin
*Assistant Examiner*—Tanh Q. Nguyen
(74) *Attorney, Agent, or Firm*—Sughrue Mion, PLLC

(57) ABSTRACT

A storage unit stores ranges of devices allocated for each sequence program. A device range checking unit sequentially extracts device notations indicating consecutive areas and commands specifying consecutive devices present in a sequence program, expands devices of the corresponding consecutive areas, and checks whether or not devices of consecutive areas are within a range of devices stored in the storage unit. The device range checking unit sequentially extracts device notations indicating consecutive areas and commands specifying consecutive devices present in a sequence program, expands devices of the corresponding consecutive areas, and checks whether or not devices of consecutive areas are within a range of devices stored in the storage unit.

12 Claims, 23 Drawing Sheets

FIG.7

| NUMBER | COMMAND | WARNING |
|---|---|---|
| 3 | MOV K4M92 D0 | L: M 92~M 99<br>G:M100~M107 |
| 7 | BMOV D45 D100 K10 | L: D 45~D 49<br>G:D 50~D 54 |

| DEVICE | LOCAL SETTING | GLOBAL SETTING |
|---|---|---|
| M | M0~M99 | M100~M8191 |
| D | D0~D49 | D50~D8191 |

FIG.12

| OVERLAPPING DEVICE | NUMBER | COMMAND |
|---|---|---|
| M100 | 3 | MOV K4M92 D12 |
|  | 5 | OUT M100 |
| D12 | 3 | MOV K4M92 D12 |
|  | 7 | BMOV D45 D10 K10 |

FIG.17

| OVERLAPPING DEVICE | NUMBER | COMMAND |
|---|---|---|
| D10Z | 3 | MOV D10 D210 |
| | 5 | MOV D19 D219 |
| W20Z | 11 | MOV W29 W209 |

FIG. 19 PRIOR ART

| | | |
|---|---|---|
| X 8K POINTS | 0-8191 GLOBAL | |
| Y 8K POINTS | 0-8191 GLOBAL | |
| M 8K POINTS | 0-99 LOCAL | ~401 |
| | 100-8191 GLOBAL | ~402 |
| D 8K POINTS | 0-99 LOCAL | |
| | 100-8191 GLOBAL | |
| T 2K POINTS | 0-255 GLOBAL | |
| | 256-511 LOCAL | |
| | 512-2047 GLOBAL | |
| C 1K POINTS | 0-127 LOCAL | |
| | 128-1023 GLOBAL | |
| B 8K POINTS | 0-8191 GLOBAL | |
| W 8K POINTS | 0-8191 GLOBAL | |

| NUMBER | COMMAND | DEVICE RANGE INFORMATION |
|---|---|---|
| 3 | MOV K40 D9000 | D8191 |

PERIPHERAL DEVICE FOR PROGRAMMABLE CONTROLLER

This application is a continuation of International Application PCT/JP99/00270, with an international filing date of Jan. 25, 1999, which designated the United States, the entire contents of which are hereby incorporated by references.

TECHNICAL FIELD

The present invention relates to a peripheral device used as a programming tool and the like for creating a sequence program for a programmable controller for controlling mechanical equipment. More particularly, this invention relates to a peripheral device having a function for checking a sequence program.

BACKGROUND ART

FIG. 18 shows a peripheral device for a programmable controller (hereinafter referred to as a PC peripheral device in some cases) in the conventional technology.

A PC peripheral device 300 is provided with a processing section 301 formed by a CPU or the like, a main storage section 302, an auxiliary storage section 303, a key input control section 304, a screen control section 305, and a printer control section 306. A keyboard 307 is connected to the key input control section 304, a display unit 308 formed by a CRT or the like is connected to the screen control section 305, and a printer 309 is connected to the printer control section 306.

The main storage section 302 is allocated for a system program area 310, a sequence program area 311, and a device range information area 312. A system program is stored in the system program area 310, a sequence program is stored in the sequence program area 311, and device range information is stored in the device range information area 312.

FIG. 19 shows a device allocation table of a PC peripheral device. The device allocation table is stored in the device range information area 312 and defines the range of each device. The device allocation table contains information such as points information 400 on each device, as well as local device range information 401 and global device range information 402 for each device.

Note that a local device is a device allocated for each sequence program, while a global device is a device common to all sequence programs.

The programmable controller peripheral device 300 stores sequence programs input by the keyboard 307 via the key input control section 304 in the sequence program area 311 of the main storage section 302. It also stores device range information in the device range information area 312 of the main storage section 302. The sequence programs and device range information stored in each area are output to the display unit 308 via the screen control section 305 and to the printer 309 via the printer control section 306, and are stored in the auxiliary storage section 303.

Here, the sequence program and device range information will be taken as already created and stored in the main storage section 302.

When checking as to whether or not there is an error in a value of a device used in a sequence program, a check instruction is given using the keyboard 307 via the key input control section 304. Based on this check instruction, the processing section 301 executes a check routine in the system program. This check routine will be described below while referring to FIG. 20.

Based on the check instruction, processing is executed so that the data of one command is acquired from the sequence program (step S301). Processing is then executed to check whether or not a device is being used in the command (step S302).

If a device is included, processing to acquire the device number is executed (step S303). Processing is then executed to check whether or not the device number exceeds the points of the device point information (step S304).

In this check, if the device number exceeds the points of the device point information, error display processing is executed to report that the range is exceeded (step S305).

It is then verified whether or not the checking has been completed down to the final step (step S306), and the above processing sequence is repeated as far as the final step.

As an example, when checking a sequence program such as that shown in FIG. 21, the checking is performed in sequence from the first command of the sequence program. When the third command is checked, "MOV K40 D9000" is acquired, and "D9000" is acquired as the device used in the command.

As shown in FIG. 22, the device "D9000" and the device range information of the device D are compared, and a check is made as to whether or not the device "D9000" is within the range of the points of the device D in the device range information. As the points of the device D are "8191", while the number of the device "D9000" is "9000", the device "D9000" is outside the range of the device D. Therefore, an error such as that shown in FIG. 23 is displayed. In the error display, the command number (list line) where the command which uses the device that exceeds the device range is present as well as one command and device range information (maximum value) are displayed on the screen.

However, because the seventh "BMOV" command of the sequence program shown in FIG. 21 is a command for copying 10 groups of data starting from "D0" to 10 data areas starting from "D8190", the ten groups of data starting from the data transfer destination device "D8190" are form the range "D8190"–"D8199". This exceeds the maximum value of the points of the device D, however, in a conventional PC peripheral device, because whether or not the data transfer destination device "D8190" is outside the device range is only being checked, no error results.

Further, in a conventional PC peripheral device, because it is not possible to check whether or not devices connected by a device notation indicating consecutive areas and commands specifying consecutive devices present in the sequence program are local devices and global devices used in combination, this check has to be performed by visually confirming the sequence program. Such a check is extremely troublesome and inconvenient, and errors in the operation of the programmable controller caused by mistakes in the checking may occur.

Furthermore, in a conventional PC peripheral device, because it is also not possible to check the checking as to whether or not devices connected by a device notation indicating consecutive areas and commands specifying consecutive devices present in the sequence program are used singly by other commands present in the sequence program, this check has to be performed by an operator visually confirming the sequence program. Such a check is extremely troublesome and inconvenient, and errors in the operation of the programmable controller caused by mistakes in the checking may occur.

Furthermore, in a conventional PC peripheral device, because it is not possible to check whether or not index modified results of commands specifying index modification devices present in the sequence program are used by other commands present in the sequence program, this check has to be performed by an operator visually confirming the sequence program. Such a check is extremely troublesome and inconvenient, and errors in the operation of the programmable controller caused by mistakes in the checking may occur.

The present invention has been achieved in order to solve the above problems. It is an object of the present invention to provide a peripheral device for a programmable controller capable of performing each of the checks below automatically, without the necessity of the confirmation work of the sequence program itself by watching by an operator. Namely, a check as to whether or not devices connected by a device notation and commands specifying consecutive devices present in a sequence program are local devices and global devices used in combination; and whether or not local devices and global devices are being used in combination in a device notation; a check as to whether or not consecutive devices of commands specifying consecutive devices present in the sequence program are used alone by other commands present in the sequence program; and a check as to whether or not index modified results of commands specifying index modification devices present in the sequence program are used by other commands present in the sequence program.

DISCLOSURE OF THE INVENTION

According to one aspect of the present invention, a peripheral device for a programmable controller comprises a storage unit which stores a range of a device allocated for each sequence program, and a device range checking unit which sequentially extracts device notations indicating consecutive areas and commands specifying consecutive devices present in a sequence program, expands devices of corresponding consecutive areas, and checks whether or not devices of consecutive areas are within a range of devices stored in the storage unit.

Therefore, the device range checking unit sequentially extracts device notations indicating consecutive areas and commands specifying consecutive devices present on the sequence program, expands devices of the corresponding consecutive areas, and checks whether or not devices of consecutive areas are within the range of devices stored in the storage unit.

According to another aspect of the present invention, a peripheral device for a programmable controller comprises a storage unit which stores device range information which defines a range of a local device allocated for each sequence program and a range of a global device common to each sequence program; and a combined local device/global device use checking unit which sequentially extracts device notations indicating consecutive areas and commands specifying consecutive devices present in a sequence program, expands devices of corresponding consecutive areas, and checks whether or not local devices and global devices are used in combination for devices of consecutive areas, by referring to device range information stored in the storage unit.

Therefore, the combined local device/global device use checking unit sequentially extracts device notations indicating consecutive areas and commands specifying consecutive devices present in a sequence program, expands devices of the corresponding consecutive areas, and checks whether or not local devices and global devices are used in combination for devices of consecutive areas, by referring to device range information stored in the storage unit.

According to still another aspect of the present invention, a peripheral device for a programmable controller comprises a device overlapping use checking unit which sequentially extracts notations indicating consecutive areas and commands specifying consecutive devices present in a sequence program, expands corresponding consecutive areas, and checks overlapping use of devices by comparing devices of consecutive areas with devices used by other commands present in an identical sequence program.

Therefore, the device overlapping use checking unit sequentially extracts notations indicating consecutive areas and commands specifying consecutive devices present in the sequence program, expands the corresponding consecutive areas, and checks overlapping use of devices by comparing devices of consecutive areas with devices used by other commands present in the identical sequence program.

According to still another aspect of the present invention, a peripheral device for a programmable controller comprises a device overlapping use checking unit which sequentially extracts commands specifying index modification devices present in a sequence program, and checks overlapping use of devices by comparing index modified result devices with devices used by other commands present in an identical sequence program.

Therefore, the device overlapping use checking unit sequentially extracts commands specifying index modification devices present in the sequence program, and checks overlapping use of devices by comparing index modified result devices with devices used by other commands present in the identical sequence program.

According to still another aspect of the present invention, a peripheral device for a programmable controller comprises a processing section formed by a CPU or the like, a main storage section allocated for a system program area which stores a system program, a sequence program area which stores a sequence program, and a device range information area, an auxiliary storage section, a key input control section, and a screen control section, wherein device range information specifying a device range is stored in the device range information area, and device notations indicating consecutive areas and commands specifying consecutive devices present in a sequence program are sequentially extracted by the processing section running a system program stored in the system program area, devices of corresponding consecutive areas are expanded, whether or not the consecutive devices are within a device range defined by device range information stored in the device range information area is checked, and a result is displayed on a display unit connected to the screen control section.

Therefore, device notations indicating consecutive areas and commands specifying consecutive devices present in the sequence program are sequentially extracted by the processing section running the system program, devices of the corresponding consecutive areas are expanded, whether or not the consecutive devices are within the device range defined by device range information stored in the device range information area is checked. The result is displayed on the display unit connected to the display control section.

According to still another aspect of the present invention, a peripheral device for a programmable controller comprises a processing section formed by a CPU or the like, a main storage section allocated for a system program area which stores a system program, and a, sequence program area which stores a sequence program, and a device range information area, an auxiliary storage section, a key input control section, and a screen control section, wherein device range information which defines a range of a local device allocated for each sequence program and a range of a global device common to each sequence program is stored in the device range information area, and device notations indicating consecutive areas and commands specifying consecutive devices present in a sequence program in the sequence program area are sequentially extracted by the processing section running a system program stored in the system program area, devices of consecutive areas are expanded based on the above extraction, whether or not local devices and global devices are used in combination for the devices of the consecutive areas is checked by referring to the device range information, and a result is displayed on a display unit connected to the screen control section.

Therefore, device notations indicating consecutive areas and commands specifying consecutive devices present in the sequence program in the sequence program area are sequentially extracted by the processing section running the system program, devices of the corresponding consecutive areas are expanded, whether or not local devices and global devices are used in combination for the devices of the consecutive areas is checked by referring to the device range information. The result is displayed on the display unit connected to the display control section.

According to still another aspect of the present invention, a peripheral device for a programmable controller comprises a processing section formed by a CPU or the like, a main storage section allocated for a system program area which stores a system program and a sequence program area which stores a sequence program, an auxiliary storage section, a key input control section, and a screen control section, wherein notations indicating consecutive areas and commands specifying consecutive devices present in a sequence program stored in the sequence program area are sequentially extracted by the processing section running a system program stored in the system program area, devices of corresponding consecutive areas are expanded, overlapping use of devices is checked by comparing devices of consecutive areas with devices used by other commands present in an identical sequence program, and a result is displayed on a display unit connected to the screen control section.

Therefore, notations indicating consecutive areas and commands specifying consecutive devices present in the sequence program stored in the sequence program area are sequentially extracted by the processing section running the system program, devices of the corresponding consecutive areas are expanded, overlapping use of devices is checked by comparing devices of consecutive areas with devices used by other commands present in the identical sequence program. The result is displayed on the display unit connected to the display control section.

According to still another aspect of the present invention, a peripheral device for a programmable controller comprises a processing section formed by a CPU or the like, a main storage section allocated for a system program area which stores a system program and a sequence program area which stores a sequence program, an auxiliary storage section, a key input control section, and a screen control section, wherein commands specifying index modification devices present in a sequence program stored in the sequence program area are sequentially extracted by the processing section running a system program stored in the system program area, overlapping use of devices is checked by comparing index modified result devices with devices used by other commands present in an identical sequence program, and a result is displayed on a display unit connected to the screen control section.

Therefore, commands specifying index modification devices present in the sequence program stored in the sequence program area are sequentially extracted by the processing section running the system program stored in the system program area, overlapping use of devices is checked by comparing index modified result devices with devices used by other commands present in the identical sequence program. The result is displayed on the display unit connected to the display control section.

BRIEF DESCRIPTION OF THE DRAWINGS

FIG. 7 is an explanatory diagram showing an example of a screen display of a result of a combined local device/global device use check;

FIG. 12 is an explanatory diagram showing an example of a screen display of a result of a first device overlapping use check;

FIG. 17 is an explanatory diagram showing an example of a screen display of a result of a second device overlapping use check;

FIG. 19 is an explanatory diagram showing an example of device range information;

FIG. 23 is an explanatory diagram showing an example of a screen display of a result of a conventional device check.

BEST MODE FOR CARRYING OUT THE INVENTION

The present invention will now be described in detail while referring to the attached figures.

Figure 1:
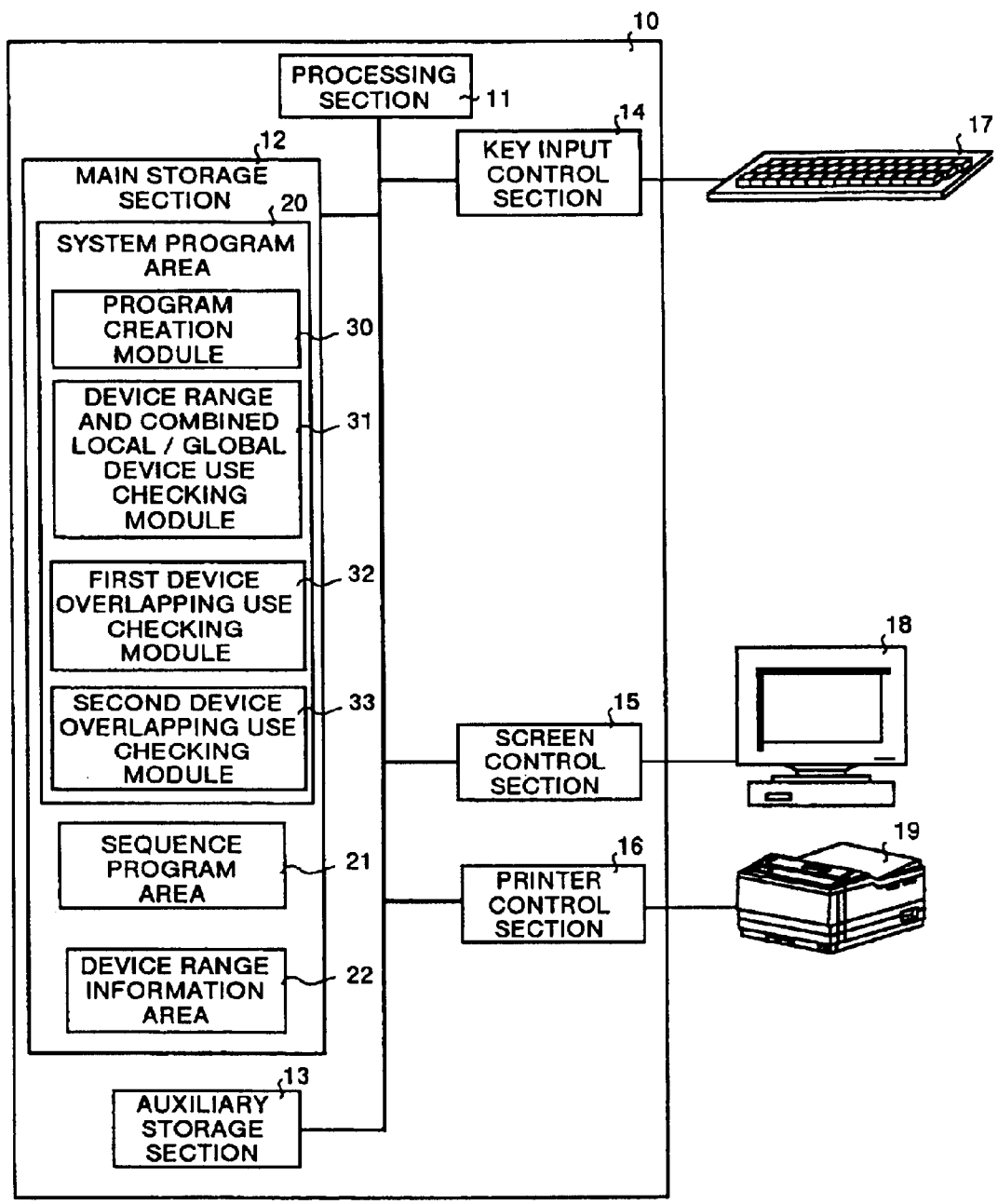
FIG. 1 is a block diagram showing a peripheral device for a programmable controller according to an embodiment of the present invention.

FIG. 1 is a block diagram of a peripheral device for a programmable controller according to the present invention. A PC peripheral device 10 comprises a processing section 11 formed by a CPU or the like, a main storage section 12, an auxiliary storage section 13, a key input control section 14, a screen control section 15, and a printer control section 16. A keyboard 17, a display unit 18 formed by a CRT or the like, and a printer 19 are connected respectively to the key control section 14, the screen control section 15, and the printer control section 16.

The main storage section 12 is allocated for a system program area 20, a sequence program area 21, and a device range information area 22. A system program, a sequence program, and device range information are stored respectively in the system program area 20, the sequence program area 21, and the device range information area 22.

In the same manner as a conventional device, the PC peripheral device 10 stores sequence programs based on ladder expressions and list expressions from the keyboard 17 via the key control section 14 in the sequence program area 21 of the main storage section 12. It also stores device range information in the device range information area 22 of the main storage section 12. The device range information may be the same as conventional device range information such as that shown in FIG. 19.

The PC peripheral device 10 also outputs sequence programs and device range information stored in the respective areas to the display unit 18 via the screen control section 15 and to the printer 19 via the printer control section 16, and also stores it in the auxiliary storage section 13.

A system program stored in the system program area 20 is provided with a program creation module 30 for the programming of a sequence program, a device range and combined local device/global device use checking (identical attribute checking) module 31, a first device overlapping use checking module 32, and a second device overlapping use checking module 33.

The device range and combined local device/global device use checking (identical attribute checking) module 31 used for checking sequentially extracts device notations indicating consecutive areas and commands specifying consecutive devices present in the sequence program, expands devices of the relevant consecutive areas, checks whether or not devices of consecutive areas are within the range of devices defined by the device range information stored in the device range information area 22, and also checks whether or not local devices and global devices are used in combination for the devices of consecutive areas by referring to the device range information in the device range information area 22.

The first device overlapping use check module 32 sequentially extracts device notations indicating consecutive areas and commands specifying consecutive devices which is present in the sequence program, expands devices of the corresponding consecutive areas, and checks device overlapping use by comparing devices of consecutive areas with devices used by other commands which is present in the same sequence program.

The second device overlapping use checking module 33 sequentially extracts commands specifying index modification devices present in a sequence program, and checks on device overlapping use by comparing index modified result devices with devices used by other commands which is present in the same sequence program.

When a check on whether devices connected by device notations indicating consecutive areas and commands specifying consecutive devices in a sequence program are within the device range determined in advance by the device range information is performed, and when a check on whether consecutive devices are local devices and global devices being used in combination is performed, a combined local device/global device use checking instruction is output from the keyboard 17 via the key input control section 14. This instruction results in the processing section 11 running the device range and combined local device/global device use checking module 31 in the system program.

Figure 2:
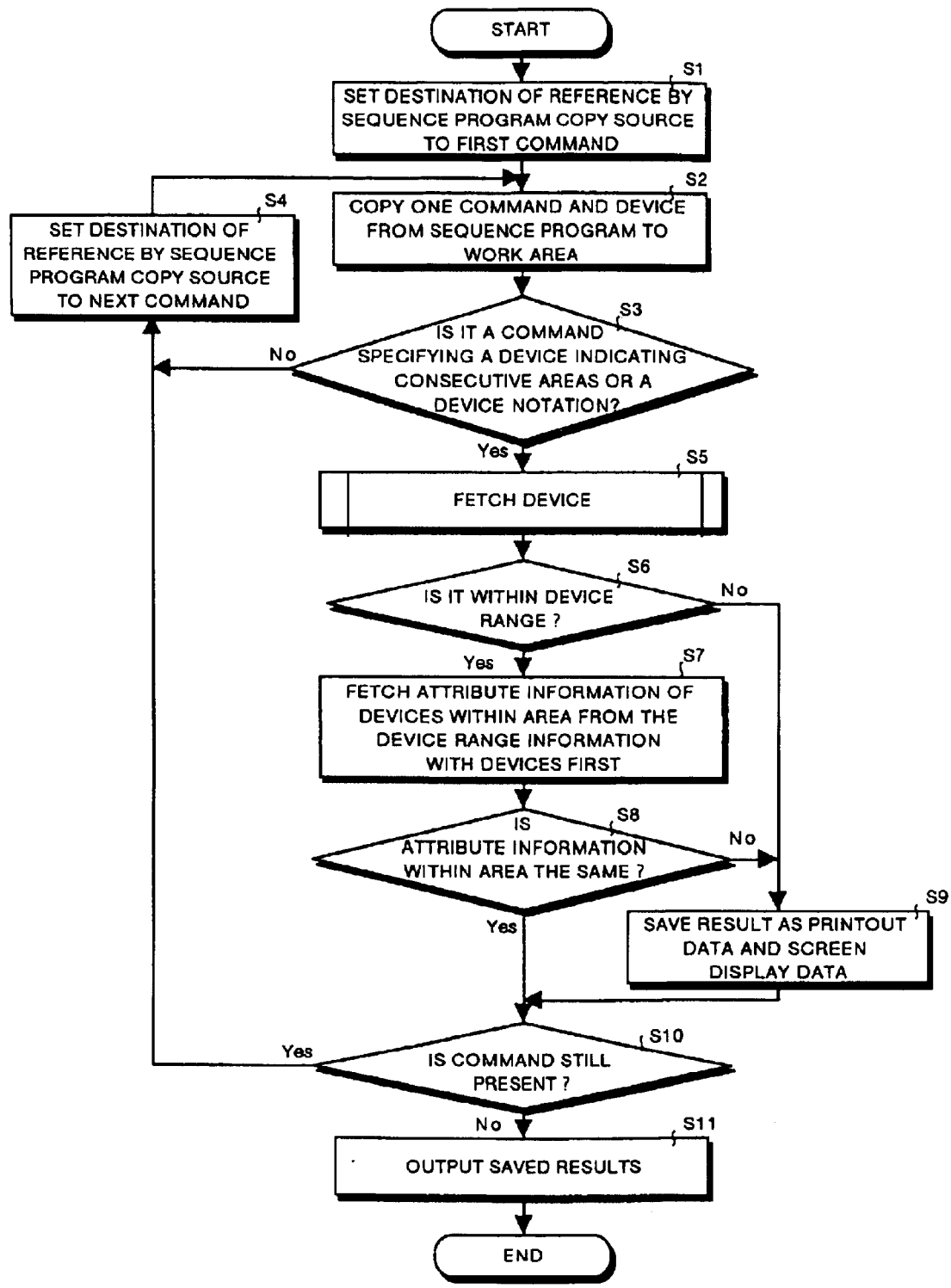
FIG. 2 is a flow chart showing a device range in a peripheral device for a programmable controller of the present invention and a flow of combined local device/global device use checking processing.

The check routine of the device range and combined local device/global device use checking module 31 will now be explained while referring to FIG. 2.

When a check instruction is given, a processing to set the destination of the reference by the sequence program copy source as the first command is performed (step S1). The first command is then set as the destination of the reference by the copy source. A processing to copy one command and device to a work area from the sequence program is then performed (step S2). By this processing one command and device are copied to a work area.

A processing to determine whether the one command and device copied to the first work area are a command specifying a device indicating consecutive areas or a device notation is then performed (step S3). If the one command and device are neither a command specifying a device indicating consecutive areas or a device notation, a processing to set the destination of the reference by the sequence program copy source to the next command is performed (step S4). By this processing, the destination of the reference by the sequence program copy source is set to the next command. The processing to copy one command and device from the sequence program to the work area (step S2) is then repeated.

If, however, the one command and device are a command specifying a device indicating consecutive areas or a device notation, a processing to fetch the device is performed (step S5). With this process, the device alone is fetched from the one command and device.

Figure 3:
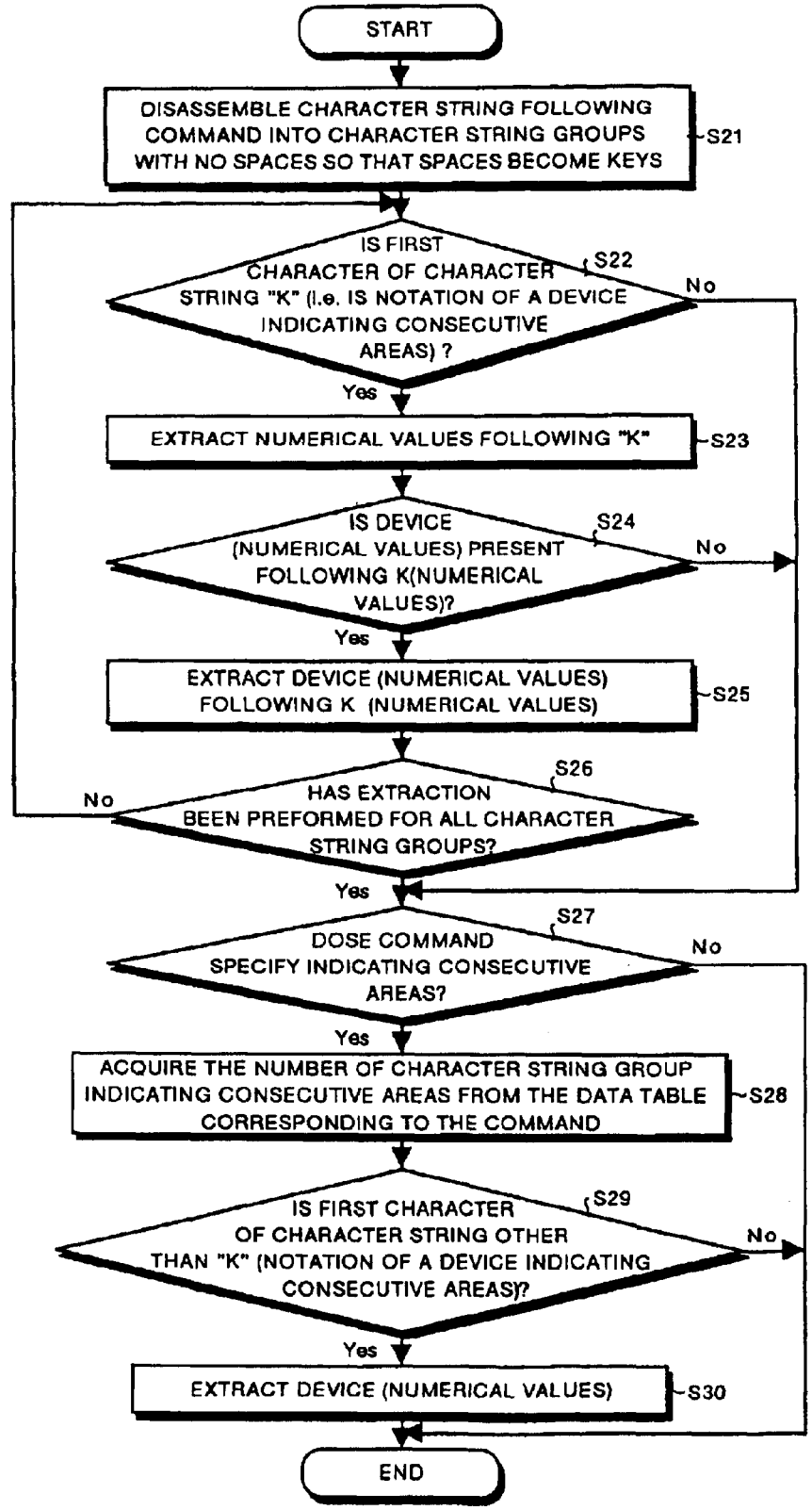
FIG. 3 is a flow chart showing a processing flow of processing for fetching a device in a peripheral device for a programmable controller of the present invention.

The processing to fetch the device (device expansion processing) will now be described while referring to FIG. 3.

A processing to disassemble one command and device into a character string following the command so that nulls (spaces) are used as keys and character string groups with no spaces are created is performed (step S21), thus forming respective device sections. A processing to determine whether or not the first character of a character string is a notation of a device indicating consecutive areas (i.e. is "K" or not) is then performed (step S22). If the first character is "K", a processing to extract the numerical values following "K" is performed (step S23). By this processing, the range of the consecutive devices acquired (expanded).

A processing to determine whether or not the device following "K" and the numerical values is present is performed (step S24). If the device is present, a processing to extract the numerical values of the device following "K" and the numerical values is performed (step S25). By this processing, the first of the consecutive devices is acquired.

A determination is then performed as to whether or not an extraction has been performed for all of the character string groups (step S26). If an extraction has not been performed for all character string groups, the routine is repeated from the processing to determine whether or not the first character of a character string is "K" (step S22).

Once extraction has been performed for all character string groups, a processing to determine whether or not the command is one specifying a device that indicates consecutive areas ("BMOV") is performed (step S27). If the command is one specifying a device that indicates consecutive areas, a processing to acquire the number of the character string group indicating the consecutive areas from the data table corresponding to the command is performed (step S28). By this processing, the device indicating the consecutive areas is acquired (expanded) from the data tables.

A processing to determine whether or not the first character of the character string of the device is a character other than "K" is then performed (step S29). If the character is a character other than "K", a processing to extract the device value is performed (step S30).

The processing to fetch the device is thus completed, and once the processing to fetch the device has been completed, a determination is then performed (the description returns here to FIG. 2) as to whether or not the devices of consecutive areas, extracted as described above, are within the device range defined by the device range information (step S6).

If the devices of consecutive areas are not within the device range defined by the device range information, a processing to save the results as printout data and screen display data is performed (step S9). By this processing, the print out data and screen display data are created and added.

If the devices of consecutive areas are within the device range defined by the device range information, a processing to fetch attribute information of the devices within the areas from the device range information with the devices of consecutive areas, extracted as described above, processed first is performed (step S7). Local device range information and global device range information are thus acquired.

A processing to determine whether or not attributes within an area are the same is then performed (step S8). Devices of consecutive areas are compared with local device range information and global device range information. If the attributes are not the same, a processing to save the results as printout data and screen display data is performed (step S9). With this process, the print out data and screen display data are created and added.

A processing to determine whether or not the command is still present is then performed (step S10). If the command is still present, the processing to set the destination of the reference by the sequence program source to the next command is performed (step S4). The destination of the reference by the sequence program source is then set to the next command and the routine is repeated from the processing to copy one command and device from the sequence program to the work area (step S2).

Once the check has finished for all the sequence programs, the saved results (check results) are output to the CRT 18 via the screen control section 15 and to the printer 19 via the printer control section 16 (step S11).

The output results comprise the command number (list line) where a command specifying a device outside the device range is present and the command, the command number (list line) where a command specifying a device notation for a local and global device used in combination and devices indicating consecutive areas is present and the command, as well as the location of the combined use and related device range information (normal local device ranges and global device ranges).

Figure 4:
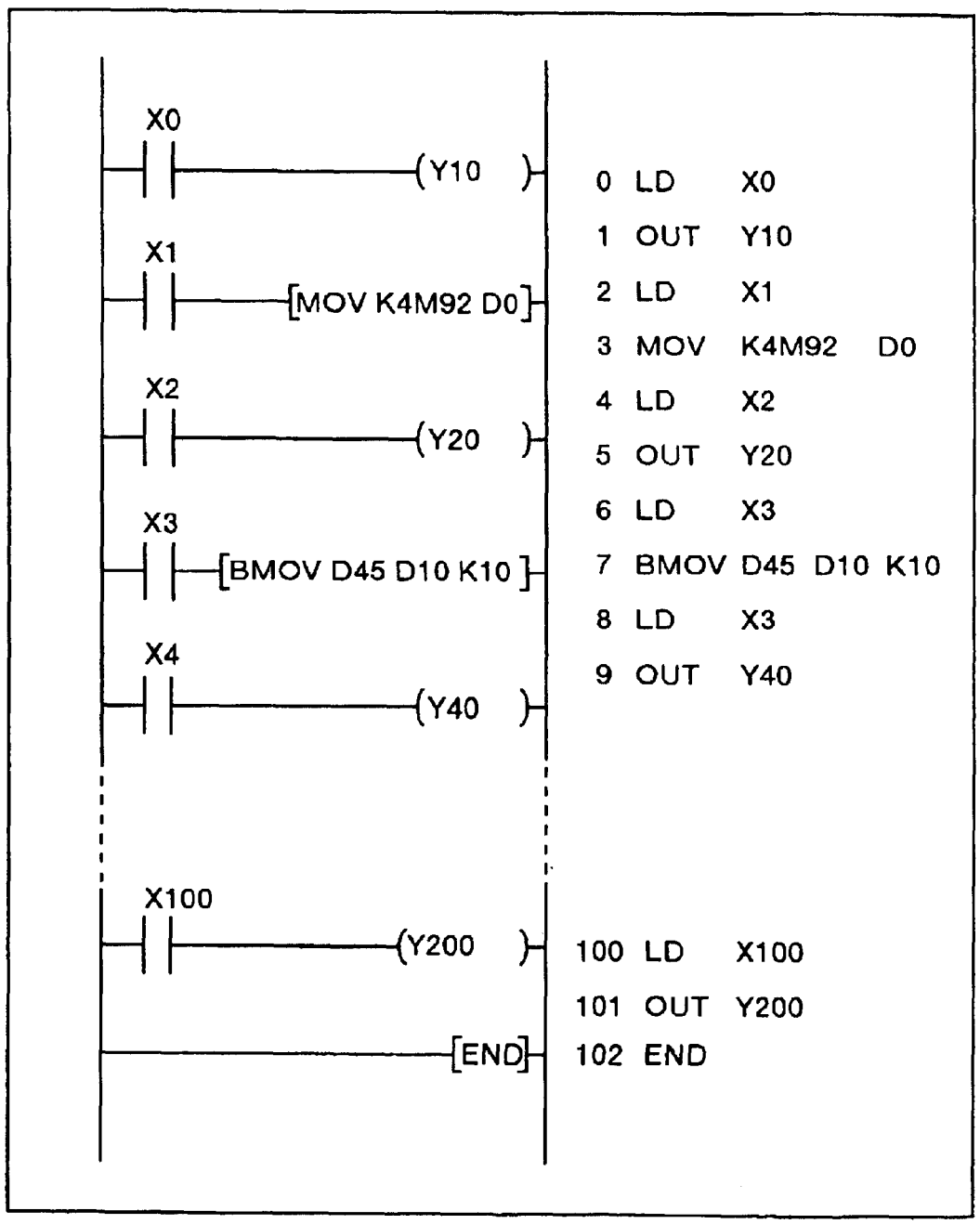
FIG. 4 is a view of a ladder circuit and list expression showing an example of a sequence program for performing a combined local device/global device use check.
Figure 5:
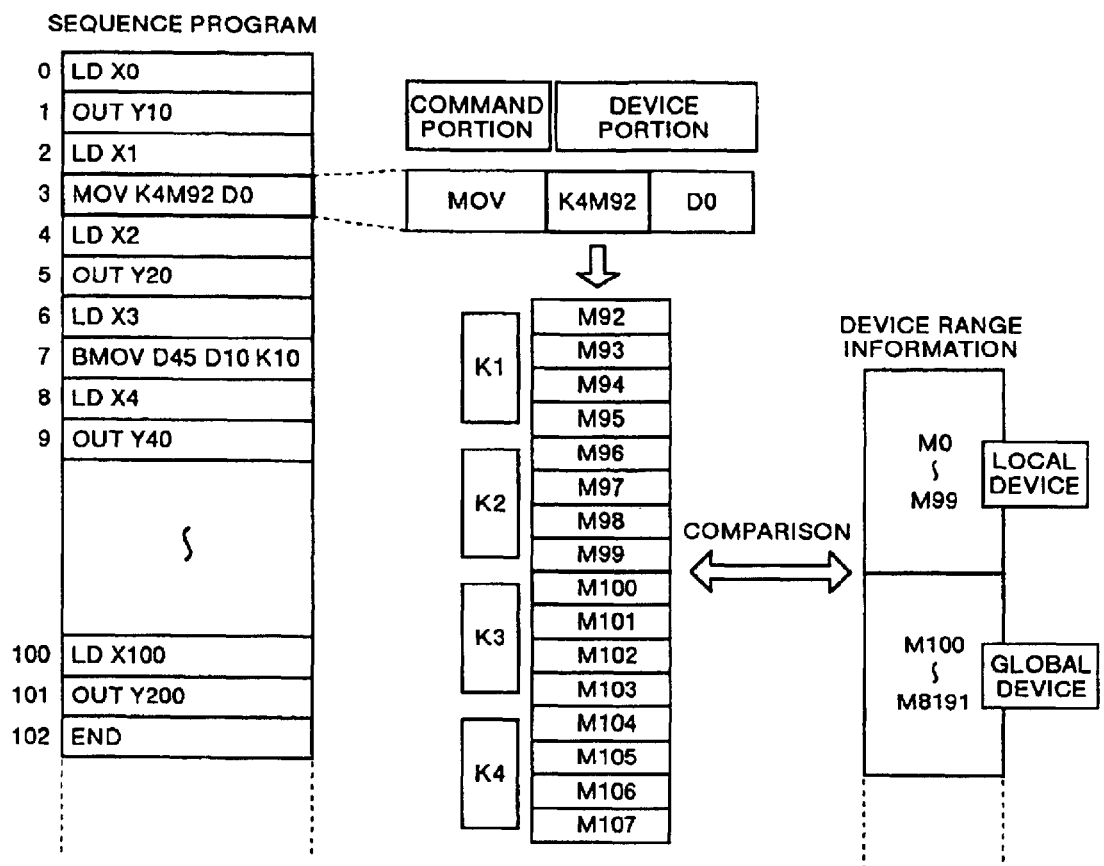
FIG. 5 and FIG. 6 are explanatory diagrams each showing examples of a combined local device/global device use check.

When the above-described check is performed for the sequence program shown in FIG. 4, the third command "MOV K4M92 D0" includes the device notation "K" indicating consecutive areas. In this command, as is shown in FIG. 5, the numerical value "4" following the first character "K" of the device section "K4M92 D0" following the command section "MOV" is extracted in the extraction processing, and the consecutive device range "K1" to "K4" is acquired.

The devices "M92" to "M107" are allocated to the range "K1" to "K4" of the consecutive devices. In this series of devices, the devices "M92" to "M99" are local devices and "M100" to "M107" are global devices relative to the device attributes defined by the device range information. Therefore, it is determined that the notation of the device indicating consecutive areas in the third command is a mixture of local and global devices used together.

Figure 6:
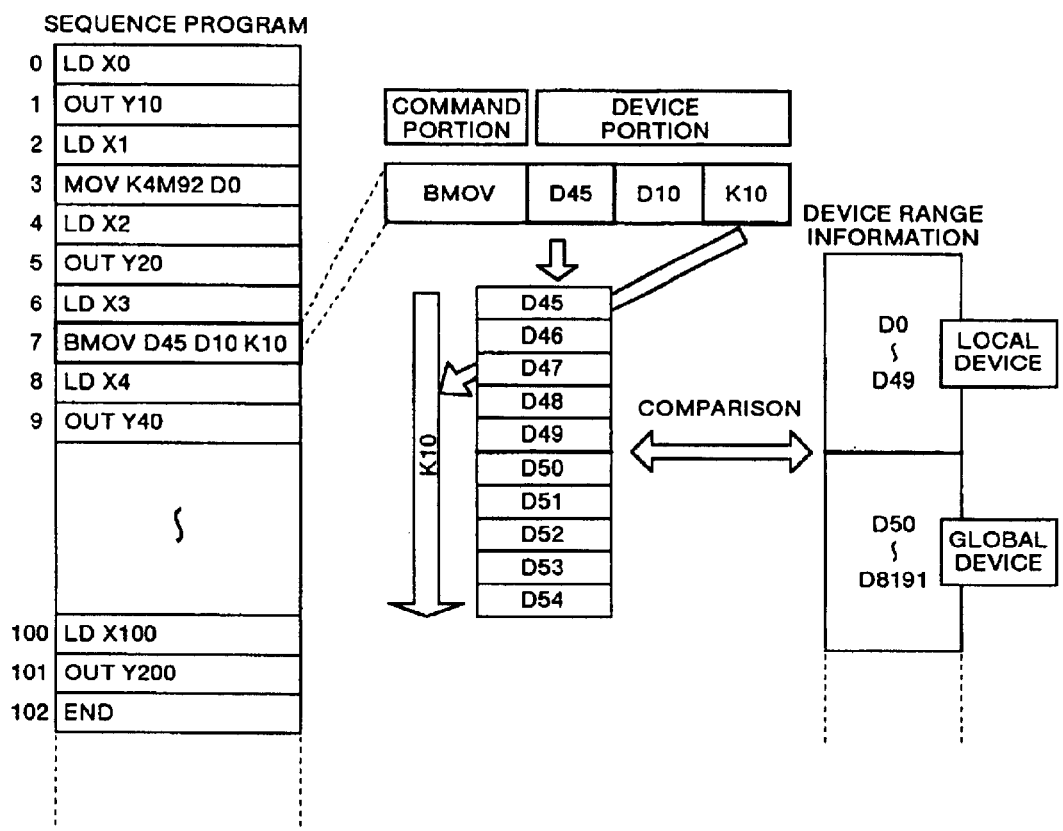

Further, the seventh command "BMOV D45 D10 K10" is a command indicating consecutive areas (a transfer command). Here, as is shown in FIG. 6, devices "D45" to "D54" indicating consecutive areas of the transfer source are acquired in accordance with this command. Note that devices indicating consecutive areas of the destination of the transfer source are acquired in the same way, however, because no error occurs here, they have been omitted.

Because the devices "D45" to "D49" are local devices and "D50" to "M54" are global devices of the devices "D45" to "D54" indicating consecutive areas relative to the device attributes defined by the device range information, it is determined that the seventh command which is indicating consecutive areas is a mixture of local and global devices used together.

The result of this is that a check result, such as that shown in FIG. 7, is displayed on the screen.

Consequently, the check of whether or not a mixture of local devices and global devices are being used in combination in consecutive devices having device notations indicating consecutive areas or commands specifying consecutive devices present in a sequence program does not require the task of visually verifying the sequence program itself, and can be automatically carried out reliably and rapidly. Therefore, the erroneous operation of the programmable controller caused by mistakes in the checking can be prevented from occurring.

When a check is performed to confirm whether or not devices connected by device notations indicating consecutive areas or commands specifying consecutive devices in a sequence program are being used independently by other commands present in the sequence program, an instruction for a first device overlapping use check is given from the keyboard 17 via the key input control section 14. By this instruction, the processing section 11 runs the first device overlapping use checking module 32 in the system program.

Figure 8:
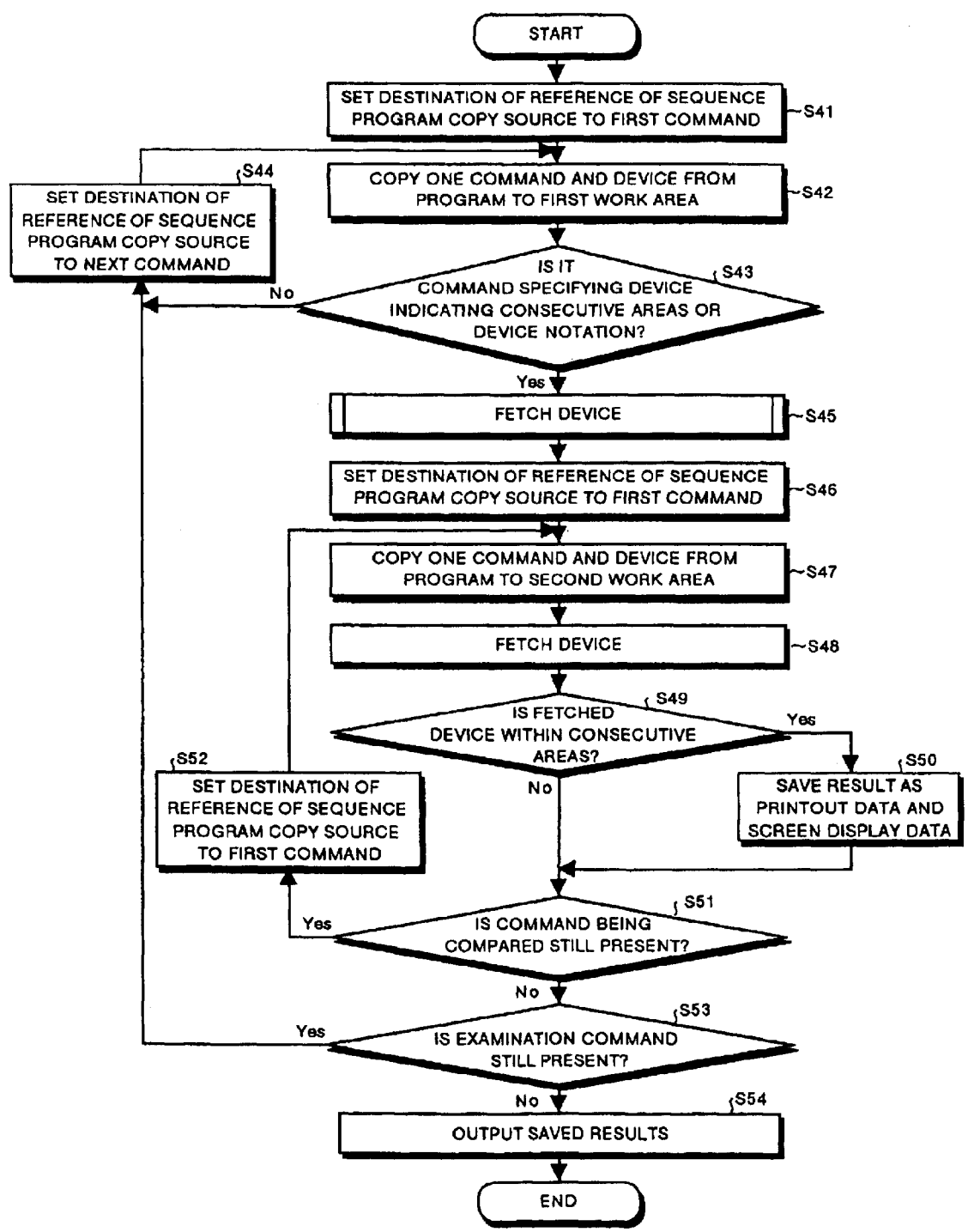
FIG. 8 is a flow chart showing a flow of processing of a first device overlapping use check in a peripheral device for a programmable controller of the present invention.

The check routine using the first device overlapping use checking module 32 will now be described while referring to FIG. 8.

When a check instruction is sent, firstly, a processing to set the destination of the reference by the sequence program copy source to the first command (the command on the examining side of overlapping use device) is performed (step S41). As a result, the first command is set as the destination of the reference by the copy source. A processing to copy one command and device from the sequence program to the first work area is then performed (step S42), and the one command and device are copied to the first work area.

A processing to determine whether or not one command and device copied to the first work area are a command specifying a device indicating consecutive areas or a device notation is then performed (step S43). If they are neither a command specifying a device indicating consecutive areas nor a device notation, a processing to set the destination of the reference by the sequence program copy source to the next command is performed (step S44). By this processing, the destination of the reference by the sequence program copy source is set to the next command. The routine is then repeated from the processing to copy one command and device from the sequence program to the work area (step S42). This corresponds to a scan of the commands on the examination side of overlapping use devices.

If, however, one command and device copied to the first work area are a command specifying a device indicating consecutive areas or a device notation, a processing to fetch the device is performed (step S45), and the device alone is fetched from one command and device. The processing to fetch the device (expansion processing) is performed in accordance with the processing routine shown in FIG. 3, in the same way as the combined local/global device use check, and an explanation thereof is omitted here.

A processing to set the destination of the reference by the sequence program copy source to the first command (the command on the side of the comparison with the overlapping use device) is then performed (step S46). By this processing, the first command is set as the destination of the reference by the copy source. A processing to copy one command and device from the sequence program to the second work area is then performed (step S47).

A processing to fetch the device from one command and device copied to the second work area is then performed (step S48).

An overlapping use determination is then made as to whether or not the device fetched from one command and device in the second work area is within the consecutive areas of one command and device of the first work area (step S49).

If the device is within the areas, a processing to save the results as printout data and screen display data is performed (step S50). By this processing, the printout data and screen display data are created and added.

A processing to determine whether or not a command on the side of the comparison with the overlapping use device is still present is then performed (step S51). If a command is still present, a processing to set the destination of the reference by the sequence program copy source to the next command is performed (step S52). By this processing, the destination of the reference by the sequence program copy source is set to the next command. The routine is then repeated from the processing to copy one command and device from the sequence program to the second work area (step S47). This corresponds to a scan of the commands on the side of the comparison with the overlapping use device.

Once the command on the side of the comparison with the overlapping use device has ended, a processing to determine whether or not a command is still present on the overlapping use device examination side is performed (step S53). If a command is still present, the processing to set the destination of the reference by the sequence program copy source to the next command is performed (step S44), and the destination of the reference by the sequence program copy source is set to the next command. The routine is then repeated from the processing to copy one command and device from the sequence program to the first work area (step S42).

Once the checking has been completed for all sequence programs, the saved results (check results) are output to the CRT 18 via the screen control section 15 and to the printer 19 via the printer control section 16 (step S54).

The output results comprise numbers (list lines) where overlapping devices, commands specifying devices indicating consecutive areas, and device notations in which the devices are used independently by other commands are present as well as the commands.

Figure 9:
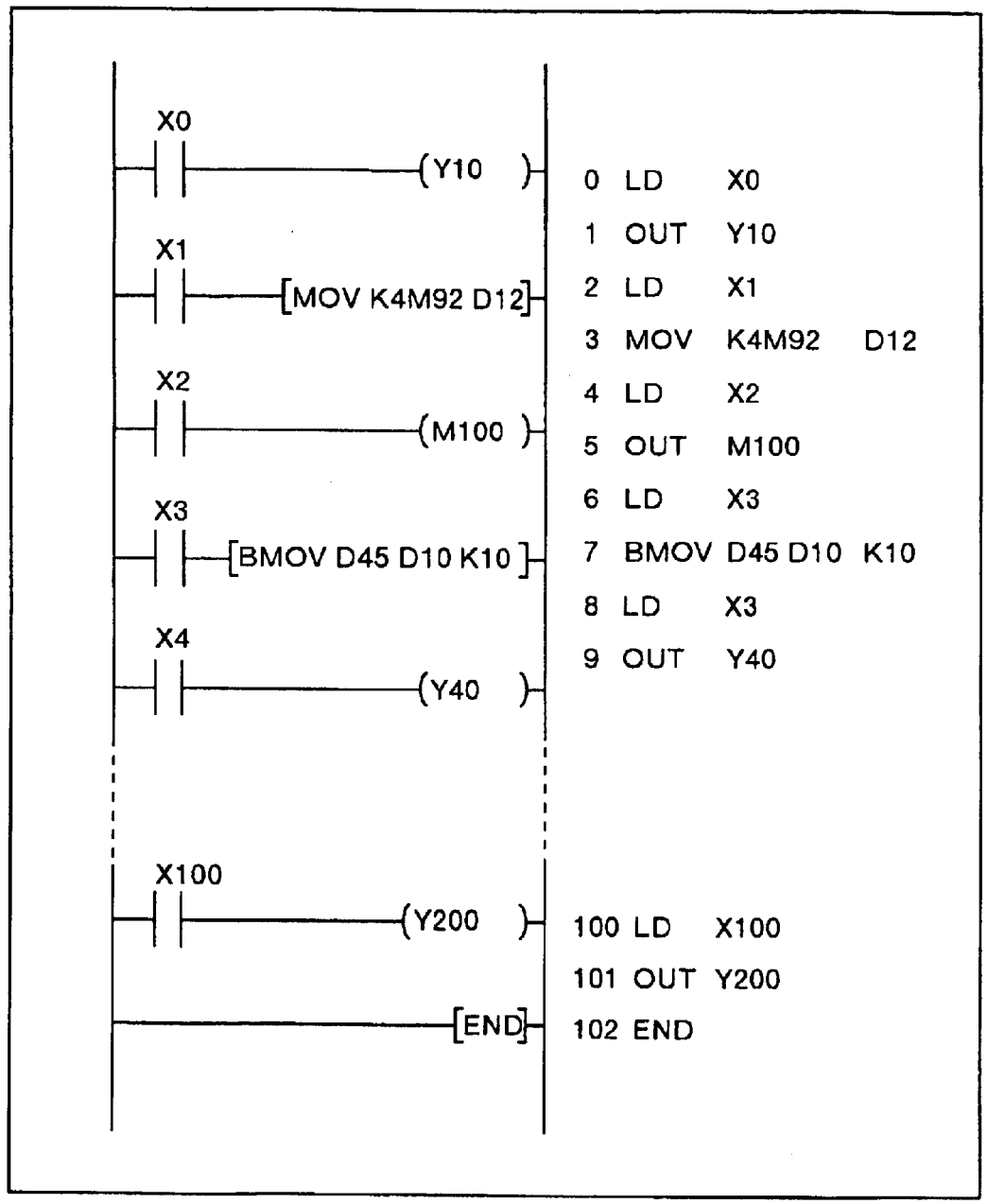
FIG. 9 is a view of a ladder circuit and list expression showing an example of a sequence program for performing a first device overlapping use check in a peripheral device for a programmable controller of the present invention.
Figure 10:
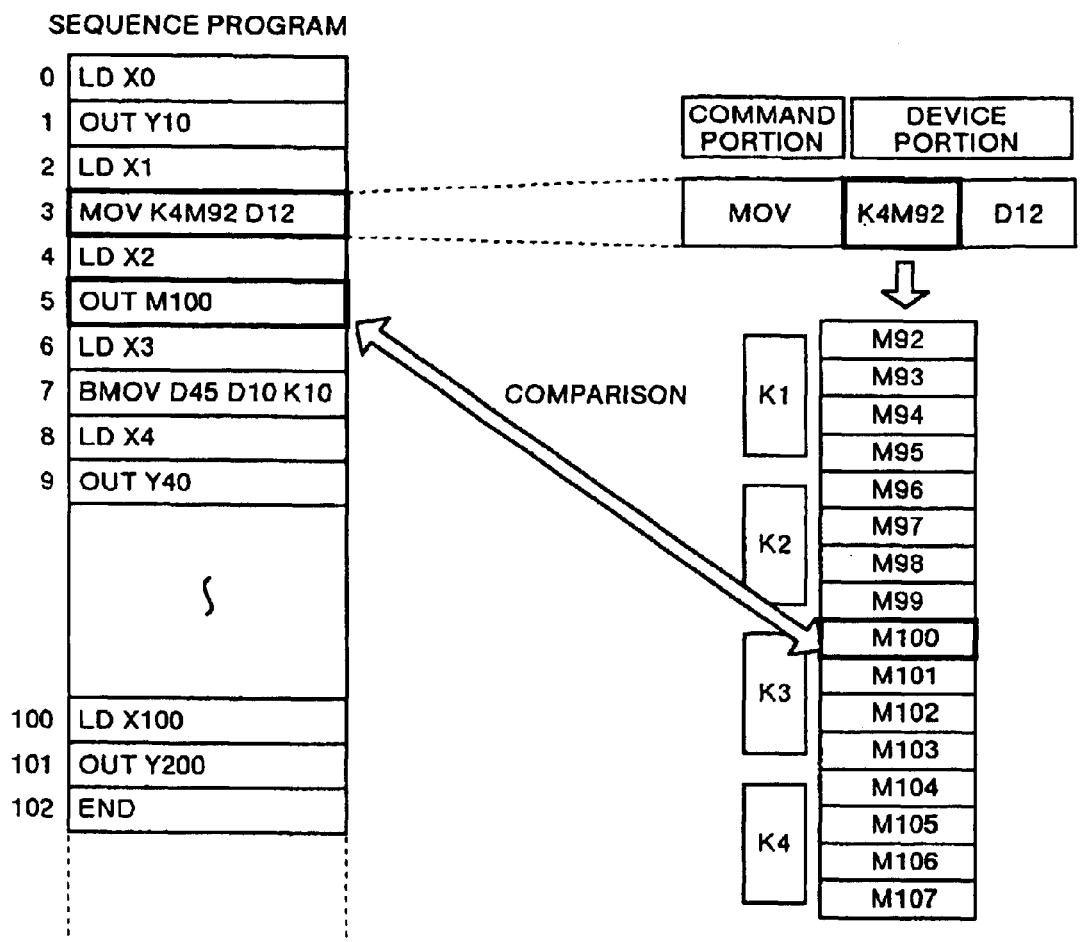
FIG. 10 and FIG. 11 are explanatory diagrams each showing an example of a first device overlapping use check.

When the above-described check is performed for the sequence program shown in FIG. 9, the third command "MOV K4M92 D12" includes the notation "K" of a device indicating consecutive areas. In this command, as is shown in FIG. 10, "4" is extracted in the processing to extract the numerical values following the first character "K" of the device portion "K4M92 D12" following the command portion "MOV" and the range of consecutive devices "K1" to "K4" is acquired. The devices "M92" to "M107" are allocated to the range of consecutive devices "K1" to "K4".

Relative to this, because, in the fifth command "OUT M100", the "M100" is being used independently, it is determined that the devices "M92" to "M107" of the consecutive areas overlap with the "M100" of the fifth command "OUT M100".

Figure 11:
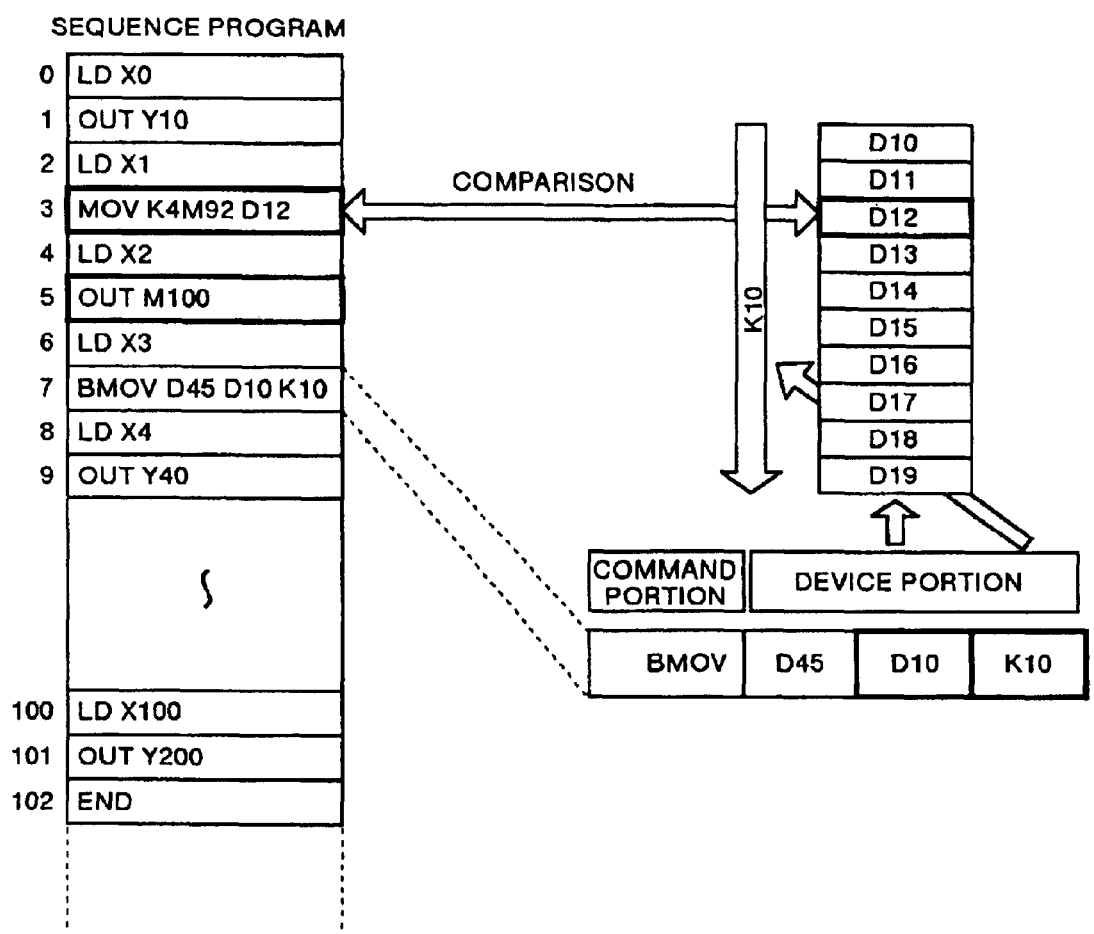

Further, the seventh command "BMOV D45 D10 K10" is a command indicating consecutive areas (a transfer command). As is shown in FIG. 11, the devices "D10" to "D19" indicating consecutive areas of the destination of the transfer are here acquired in accordance with his command.

Relative to this, because, in the third command "MOV K4M92 D12", the "D12" is being used independently, it is determined that the devices "D10" to "D19" of the consecutive areas overlap with the "D12" of the third command "MOV K4M92 D12".

As a result, the check results are displayed on a screen as is shown in FIG. 12.

Accordingly, the check as to whether or not devices connected by device notations indicating consecutive areas or commands specifying consecutive devices in a sequence program are being used independently by other commands present in the sequence program can be automatically performed reliably and rapidly without the necessity of the visual confirmation of the sequence program itself. The erroneous operation of the programmable controller caused by mistakes in the checking can thus be prevented from occurring.

When checking whether or not index modified results of commands specifying index modification devices present in the sequence program are being used by other commands present in the sequence program, an instruction for a second device overlapping use check is given from the keyboard 17 via the key input control section 14. In addition, the range to be index modified (the index modification range Z=0 to 10) is also input. By this instruction, the processing section 11 runs the second device overlapping use check module 33 in the system program.

Figure 13:
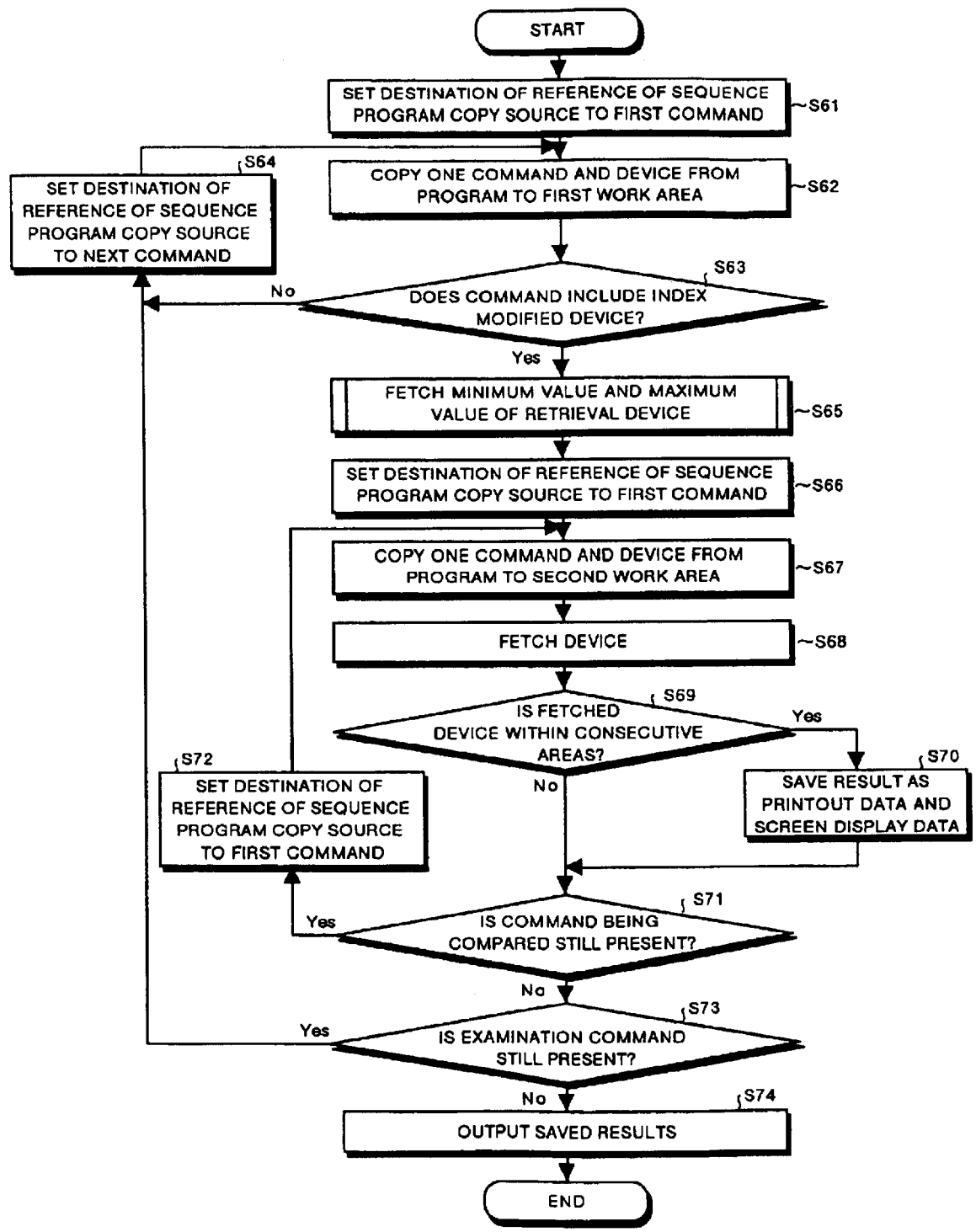
FIG. 13 is a flow chart showing a flow of processing of a second device overlapping use check in a peripheral device for a programmable controller of the present invention.

The check routine using the second device overlapping use checking module 33 will now be described while referring to FIG. 13.

When a check instruction is sent, a processing to set the destination of the reference by the sequence program copy source to the first command is performed (the command on the examination side of the overlapping use device) (step S61). By this processing the first command is set as the destination of the reference by the copy source. A processing to copy one command and device from the sequence program to the first work area is then performed (step S62). With this process, the one command and device are copied to the first work area.

A process to determine whether or not one command and device copied to the first work area are a command including an index modified device is then performed (step S63).

If they are not a command including an index modified device, a processing to set the destination of the reference by the sequence program copy source to the next command is performed (step S64). With this process, the destination of the reference by the sequence program copy source is set to the next command. The routine is then repeated from the processing to copy one command and device from the sequence program to the work area (step S62).

If, however, one command and device copied to the first work area are a command which includes an index modified device, a processing to fetch the minimum and maximum values of the retrieval device is performed (step S65). With this process, the minimum and maximum values of the retrieval device are fetched from one command and device.

Figure 14:
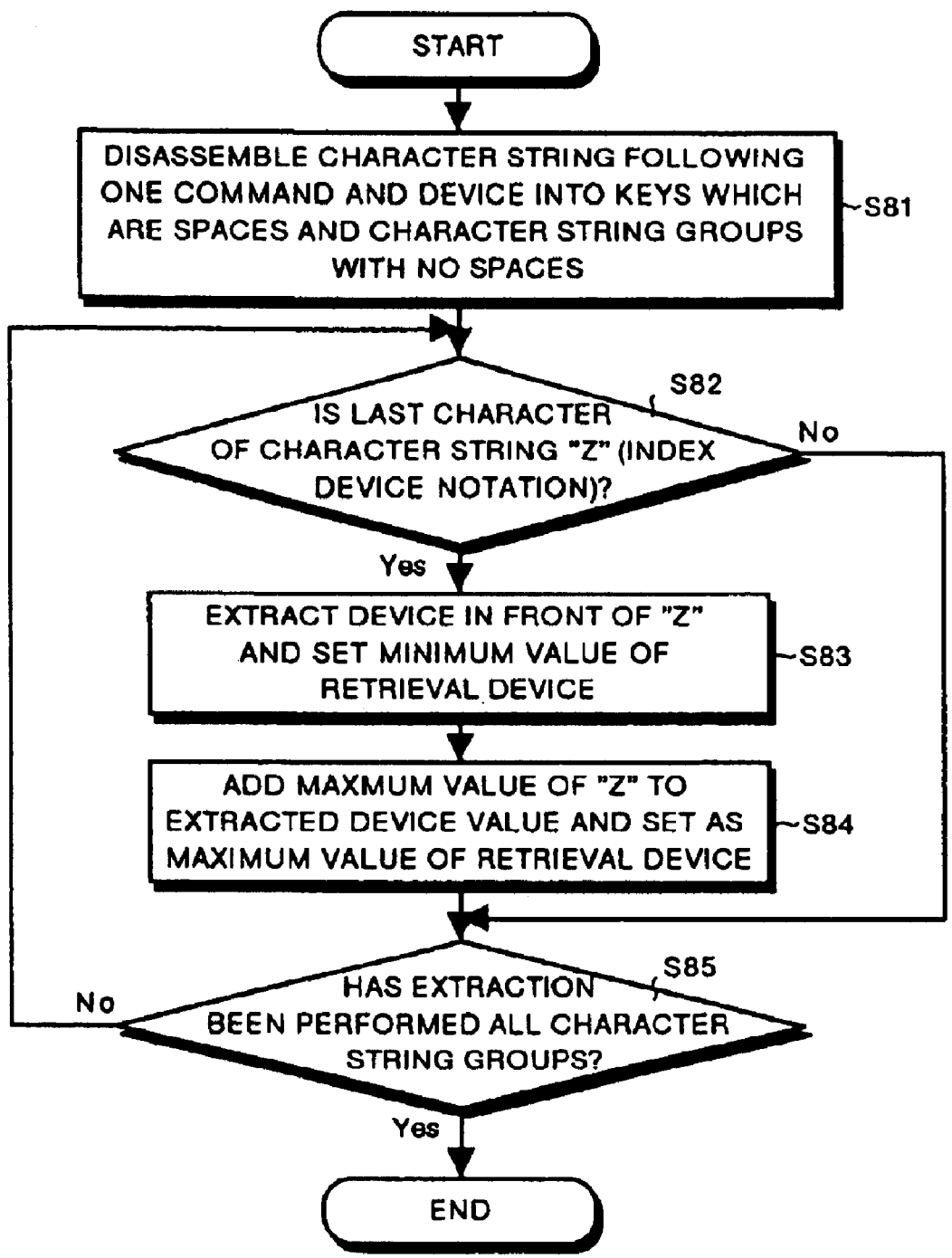
FIG. 14 is a flow chart showing a processing flow of processing to extract a minimum value and a maximum value of a retrieval device in a peripheral device for a programmable controller of the present invention.

The processing to fetch the minimum and maximum values of the retrieval device is now described while referring to FIG. 14.

A processing to disassemble a character string following one command and device into character string groups with no spaces and so that the spaces become keys is performed (step S81). With this process, a device section is disassembled into each device.

A process to determine whether or not the last character of a character string of a disassembled device is a notation of an index device is then performed (i.e. is "Z" or not) (step S82).

If the last character is not "Z", a processing to determine whether or not extraction has been performed for all character string groups is performed (step S85). If extraction has been performed for all character string groups, the routine is ended. If, however, extraction has been performed for only a portion of the character string groups, the processing to determine whether or not the last character of a character string is "Z" (step S82) is repeated for all the devices in the device portion.

If the last character is "Z", the device value before "Z" is extracted and set as the minimum value of the retrieval device (step S83).

The index modification range (Z=10), which is the maximum value of Z input using the keyboard, is added to the extracted device value and this is set as the maximum value of the retrieval device (step S84).

A process to determine whether or not extraction has been performed for all character string groups is then performed (step S85). The processing to determine whether or not the final letter of a character string is "Z" (step S82) is repeated until it is performed for all the devices included in the device section with the result that the processing is repeatedly performed for all the devices.

The processing to fetch the minimum and maximum values of the retrieval device is completed by the above procedure. Once the processing to fetch the minimum and maximum values of the retrieval device is completed, a processing (the description returns here to FIG. 13) to set the destination of the reference by the sequence program copy source to the first command (the command on the side of the comparison with the overlapping use device) is performed (step S66). Consequently, the first command is set as the destination of the reference by the copy source. A processing to copy one command and device from the sequence program to the second work area is then performed (step S67).

A processing to fetch the device from the one command and device copied to the second work area is then performed (step S68).

An overlapping use determination is performed as to whether or not the device fetched from the one command and device in the second work area is within the retrieval area of the device of the one command and device of the first work area (the command which includes the index modified device) (step S69).

If it is within the retrieval area, a processing to save the results as printout data and screen display data is performed (step S70). With this process, printout data and screen data are created and added.

A processing to determine whether or not a command on the side of the comparison with the overlapping use device is still present is then performed (step S71). If a command is still present, a processing to set the destination of the reference by the sequence program copy source to the next command is performed (step S72). With this process, the destination of the reference by the sequence program copy source is set to the next command. The routine is then repeated from the processing to copy one command and device from the sequence program to the second work area (step S67).

Once the command on the side of the comparison with the overlapping use device is ended, a processing to determine whether or not a command on the overlapping use device examination side is still present is performed (step S73). If the command is still present, the processing to set the destination of the reference by the sequence program copy source to the next command is performed (step S64), and the destination of the reference by the sequence program copy source is set to the next command. The routine is then repeated from the processing to copy one command and device from the sequence program to the first work area (step S62).

Once checking of all sequence programs has ended, the saved results (check results) are output to the CRT 18 via the screen control section 15 and to the printer 19 via the printer control section 16 (step S74).

Index modified devices, commands overlapping the index modified results, and the commands are outputted in the output results.

Figure 15:
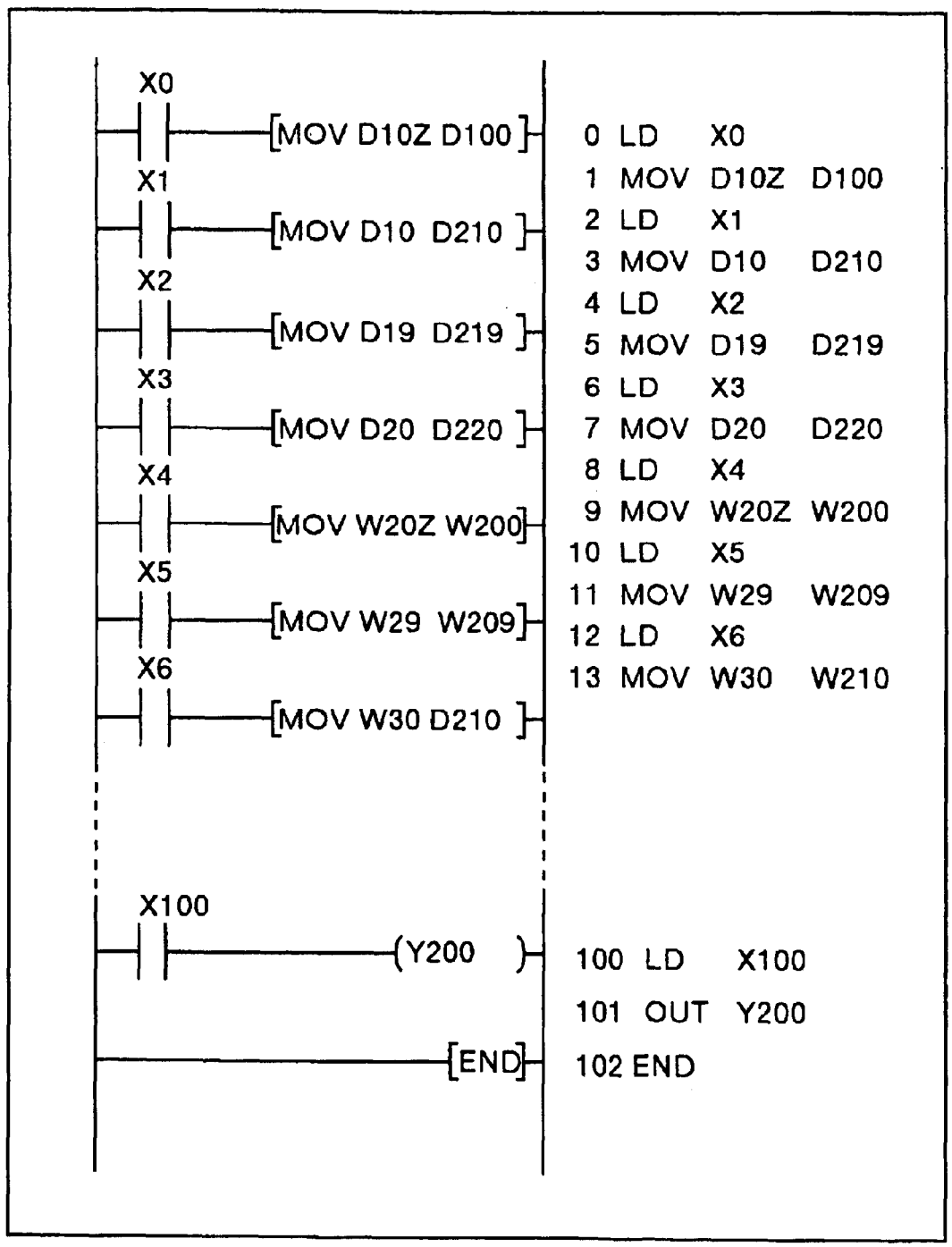
FIG. 15 is a view of a ladder circuit and list expression showing an example of a sequence program for performing a second device overlapping use check.
Figure 16:
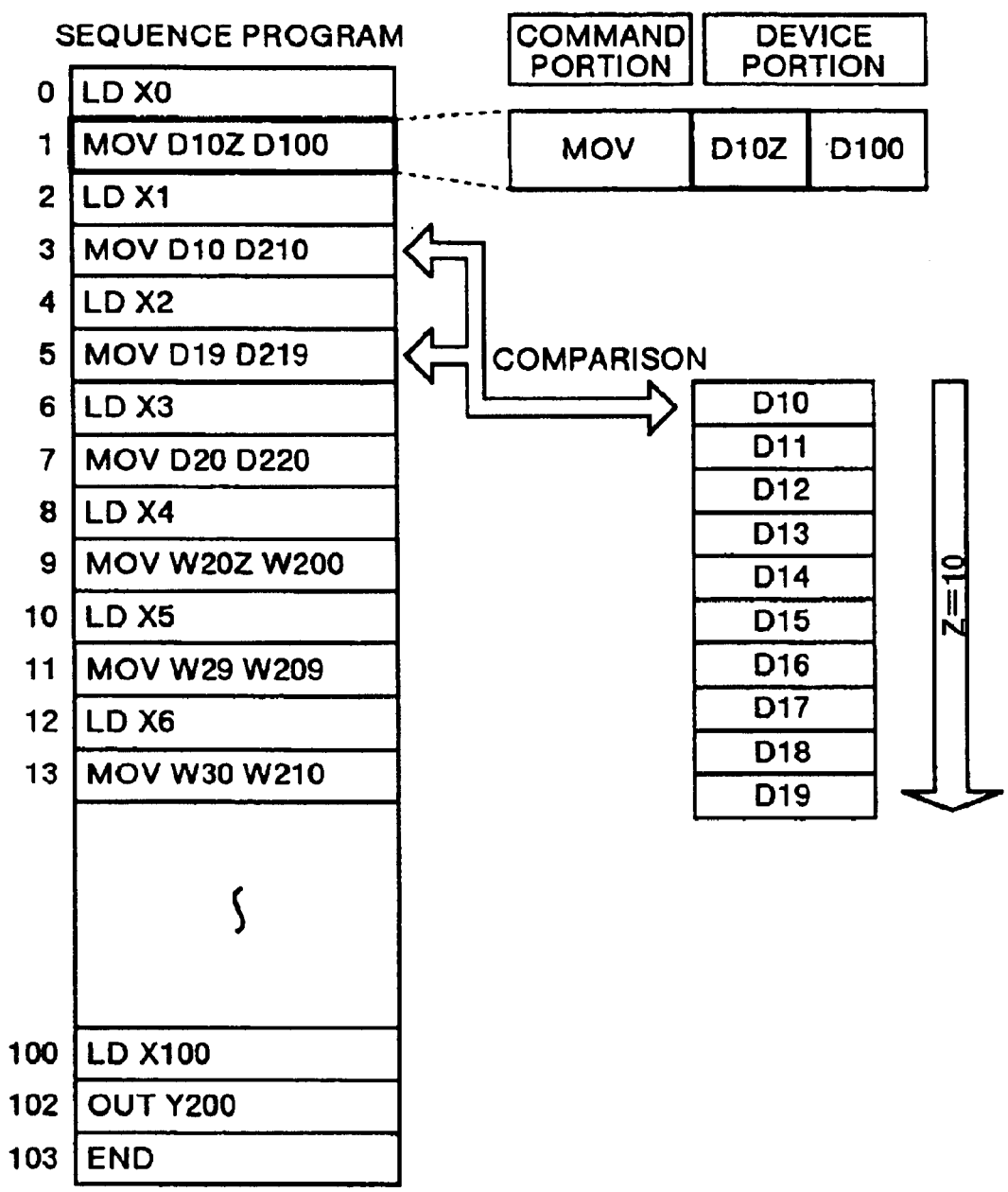
FIG. 16 is an explanatory diagram showing an example of a second device overlapping use check.
Figure 18:
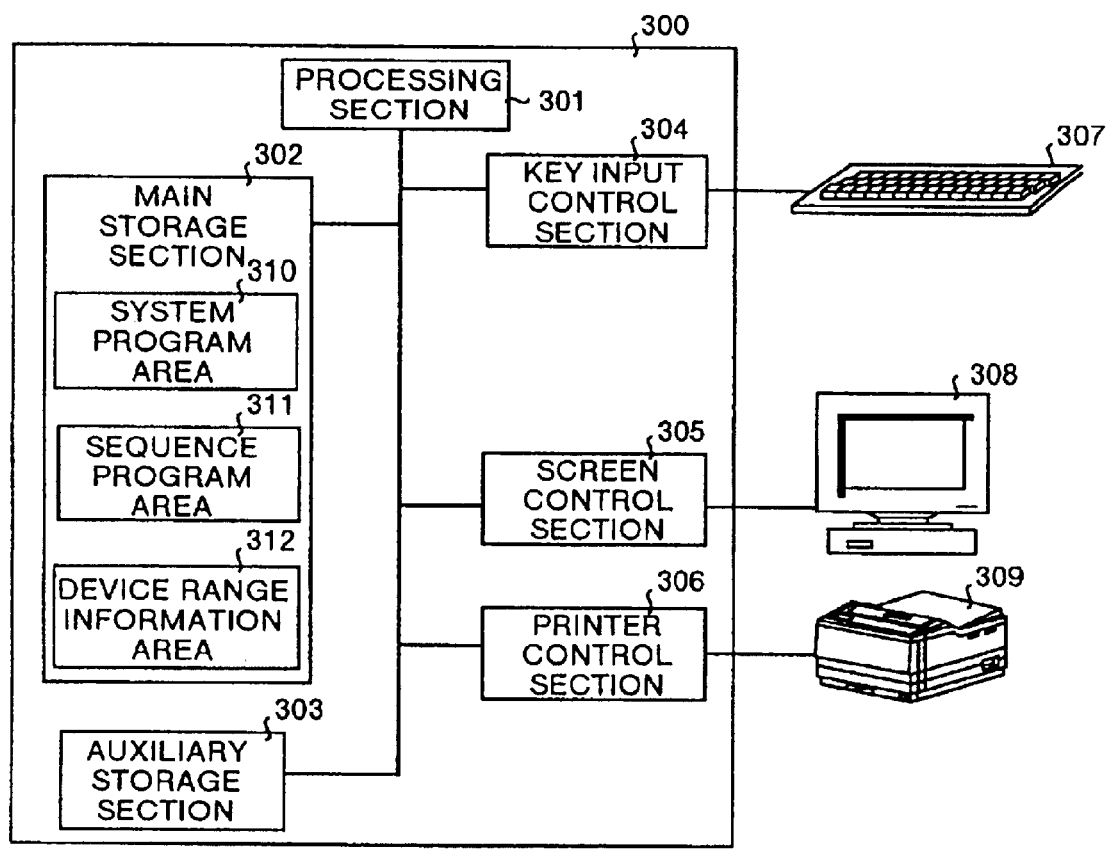
FIG. 18 is a block diagram showing a conventional peripheral device for a programmable controller.
Figure 20:
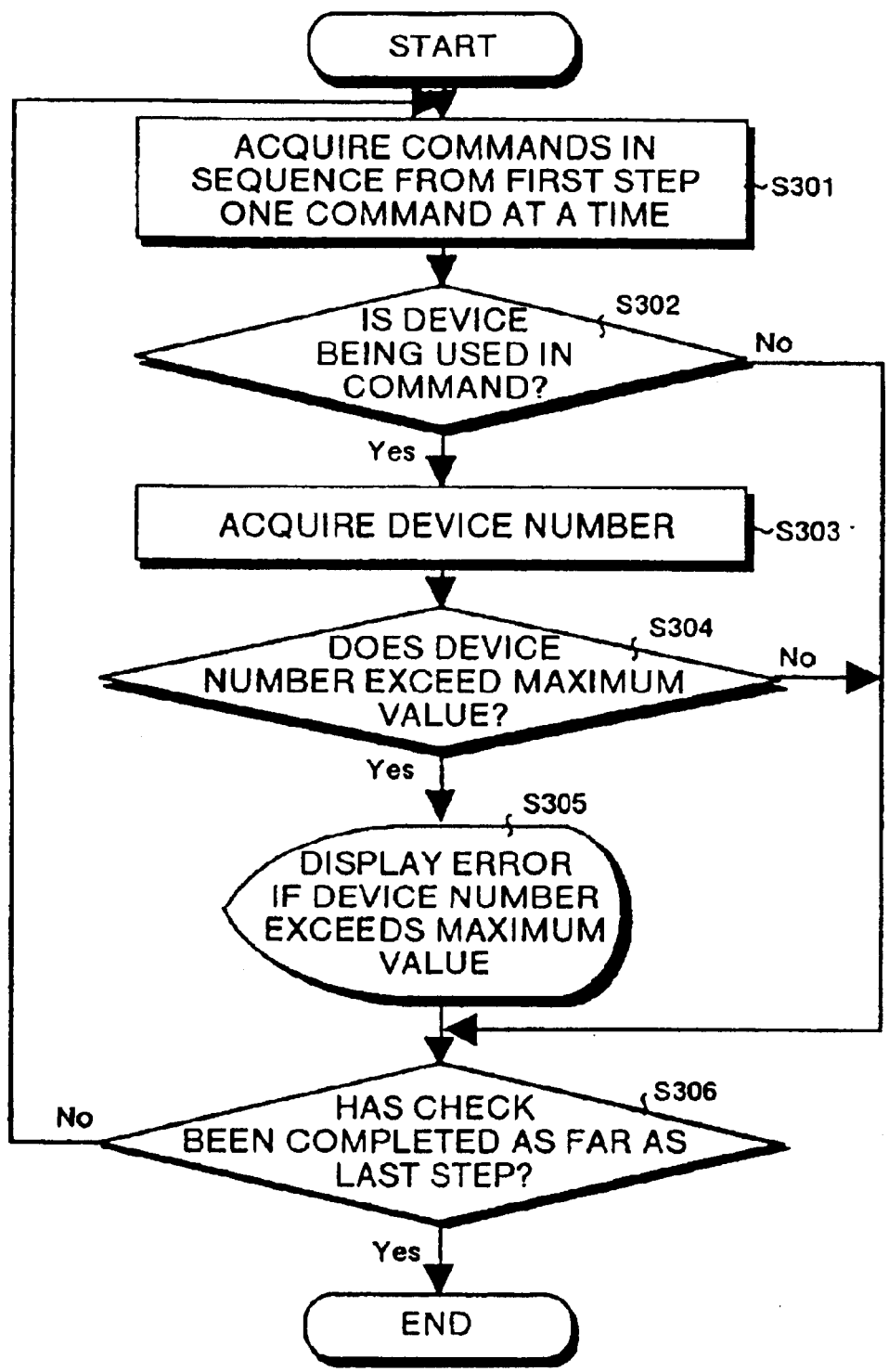
FIG. 20 is a flow chart showing a device check in a conventional peripheral device for a programmable controller.
Figure 21:
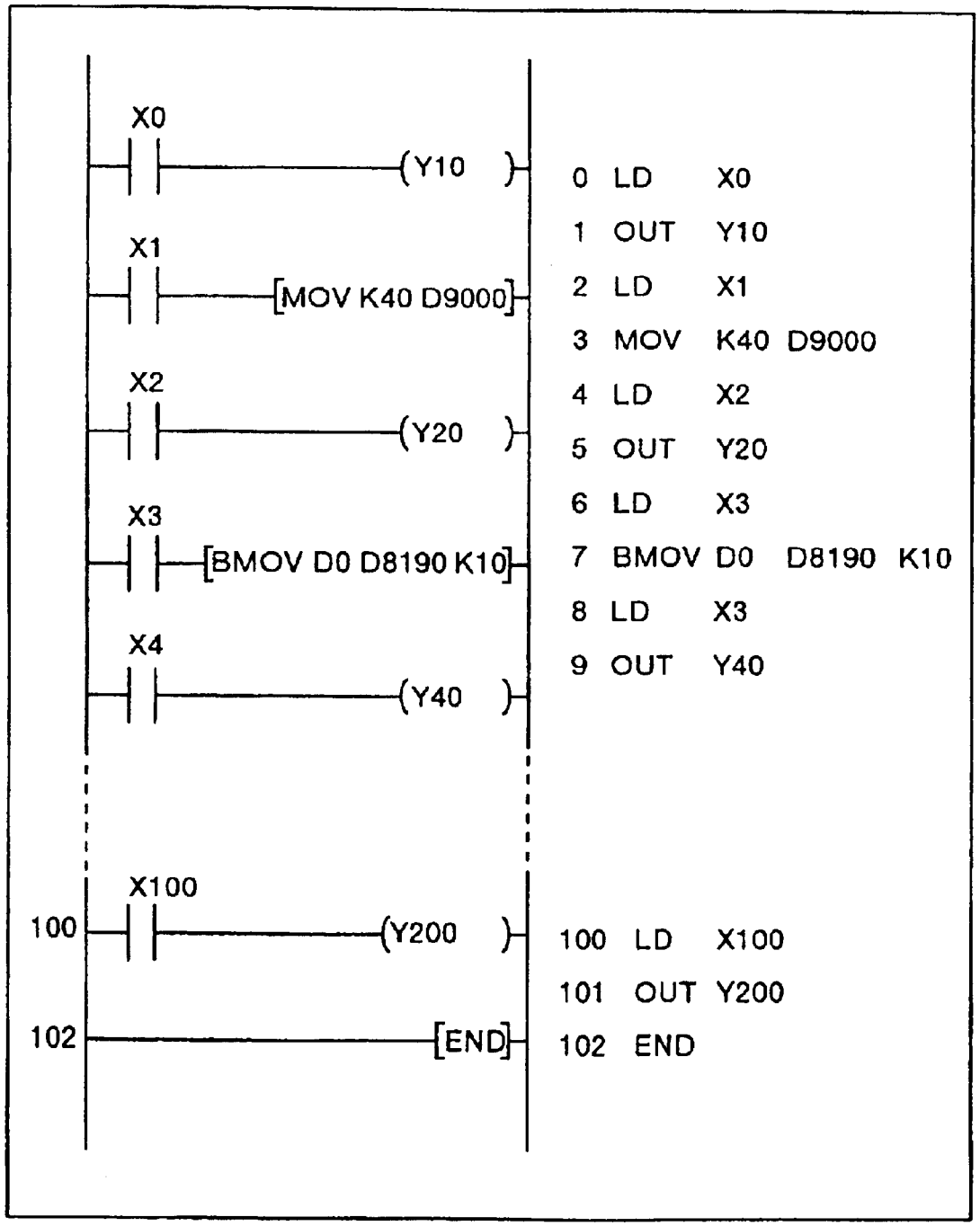
FIG. 21 is a view of a ladder circuit and list expression showing an example of a sequence program for performing a conventional device check.
Figure 22:
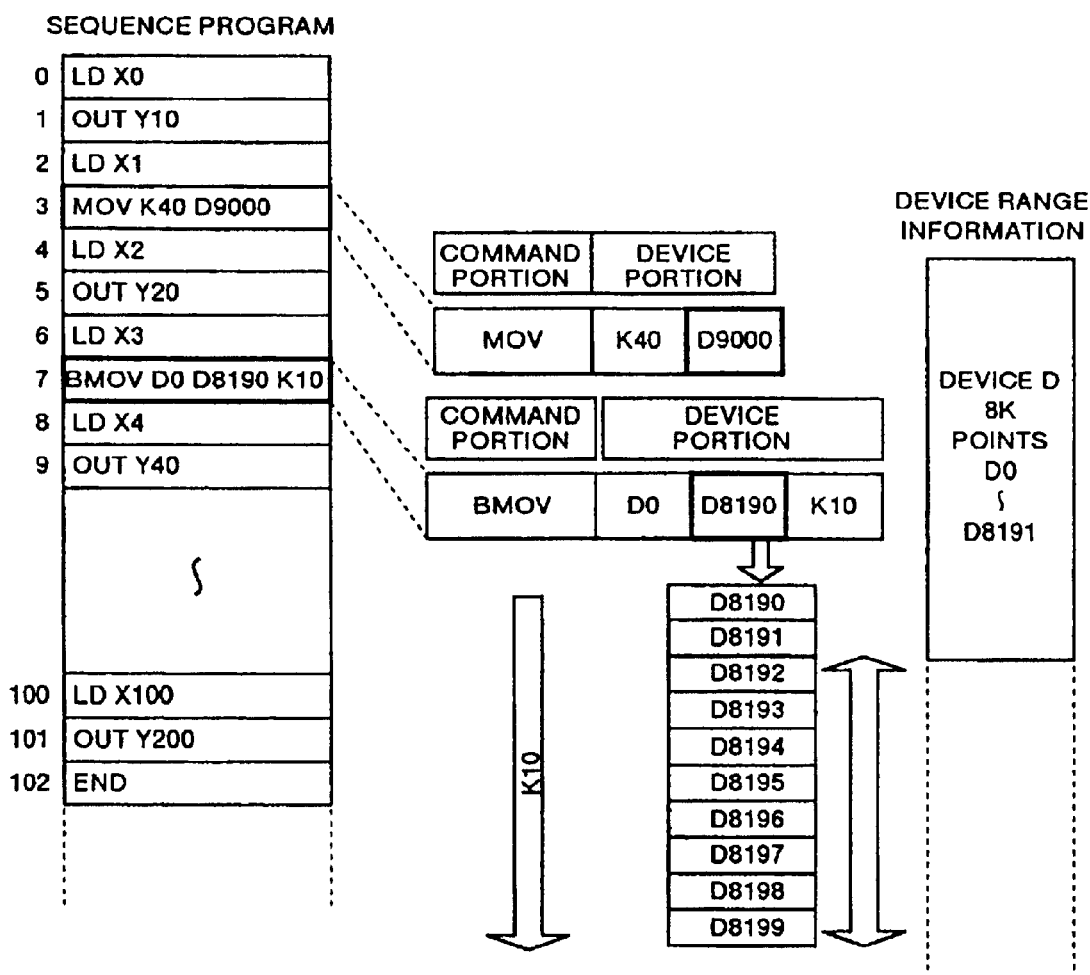
FIG. 22 is an explanatory diagram showing an example of a conventional device check.

When the above check is performed for the sequence program shown in FIG. 15, the first command "MOV D10Z D100" is a command specifying an index modification device. As is shown in FIG. 16, the minimum value "D10" and maximum value "D19" of a retrieval device are fetched and the device retrieval range "D10" to "D19" is acquired.

Relative to this, because "D10" is used in the third command "MOV D10 D120" and "D19" is used in the fifth command "MOV D19 D219", the index modified result of "MOV D10Z D100" is determined to be used overlappingly with the devices used in the third and fifth commands.

When the same process is performed for the ninth command "MOV W20Z W200", the index modified result is determined to be used overlappingly with the device used in the eleventh command.

The result of this is that check results, such as those shown in FIG. 17, are displayed on the screen.

Accordingly, the check as to whether or not the index modified result of a command specifying an index modification device present in a sequence program is used by another command present in the sequence program can be automatically performed reliably and rapidly without the necessity of the task of visually confirming the sequence program itself, and erroneous operation by the programmable controller due to checking mistakes can be evaded beforehand.

Industrial Applicability

A peripheral device for creating a sequence program for a programmable controller for controlling mechanical equipment can be used for automatically checking the sequence program.

What is claimed is:

1. A peripheral device for a programmable controller comprising:

a storage unit which stores a range of a device allocated for each sequence program; and a device range checking unit which sequentially extracts device notations indicating consecutive areas and commands specifying consecutive devices present in a sequence program, expands devices of corresponding consecutive areas, and checks whether or not the devices of consecutive areas are within a range of devices stored in said storage unit.

2. The peripheral device according to claims 1, wherein when checking whether or not the devices are within the range, said device range checking unit checks whether or not local devices and global devices are used in combination in the consecutive areas based on the range of the local device and device range information which defines the range of the global devices that are common to each sequence program.

3. The peripheral device to claim 1, wherein after completion of the check of the device range by said device range checking unit, said device in the consecutive area checks whether or not local devices and global devices are used in combination in the consecutive areas based on the range of the local device and device range information which defines the range of the global devices that are common to each sequence program.

4. A peripheral device for a programmable controller comprising:

a system program area which stores a system program;

a sequence program area which stores a sequence program;

a device range information area which stores device range information that defines a range of a device; and a processing section which sequentially extracts device notations indicating consecutive areas and commands specifying consecutive devices present in a sequence program of said system program area by running the system program stored in said system program area, expands the devices of corresponding consecutive areas, checks whether or not said devices in the consecutive areas are within a device range defined by device range information stored in the device range information area, and reports a result of checking.

5. The peripheral device according to claim 4, wherein when checking whether or not the devices are within the range, said processing section checks whether or not local devices and global devices are used in combination in the consecutive areas based on the range of the local device allocated for each of the sequence program and device range information which defines the range of the global device that are common to each sequence program.

6. The peripheral device according to claim 4, wherein after completion of the check of the device range by said processing section, said device in the consecutive area checks whether or not local devices and global devices are used in combination in the consecutive areas based on the range of the local device and device range information which defines the range of the global devices that are common to each sequence program.

7. A peripheral device for a programmable controller comprising:

a storage unit which stores a range of a device allocated for each sequence program; and a processing unit which sequentially extracts device notations indicating consecutive areas and commands specifying consecutive devices present in a sequence program, acquiring devices corresponding to the consecutive areas specified by a device notation, and checks whether or not each of said consecutive areas is within a range of a corresponding device.

8. The peripheral device for a programmable controller as set forth in claim 7, wherein the processing unit determines whether the device notation indicates said consecutive areas.

9. The peripheral device for a programmable controller as set forth in claim 8, wherein if the processing unit determines that the device notation indicates consecutive areas, the processing unit for each consecutive area of the consecutive areas specified by the device notation, acquires the range of the device corresponding to the consecutive area.

10. The peripheral device for a programmable controller as set forth in claim 9, wherein the processing unit consecutively checks whether each of said consecutive areas is within the range of the device corresponding to the consecutive area.

11. The peripheral device for a programmable controller as set forth in claim 7, wherein the processing unit determines whether the command specifies a device with consecutive areas.

12. The peripheral device for a programmable controller as set forth in claim 11, wherein, when the command specifies a device with consecutive areas, each of said consecutive areas is checked to determine whether said consecutive area is within the range of the device.

* * * * *